Aug. 17, 1937.  R. SERRELL  2,090,521
ACCELEROMETER
Filed May 2, 1934
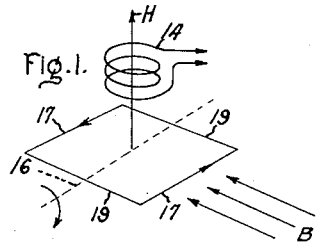
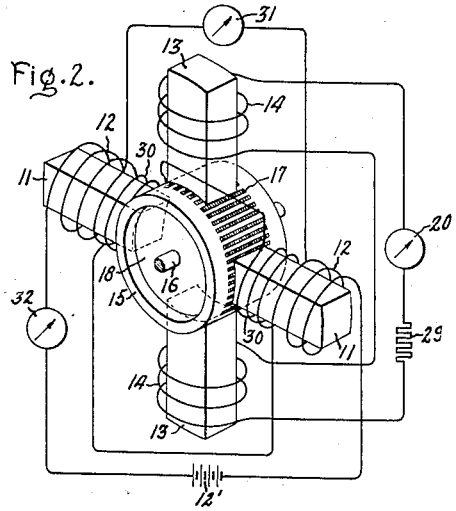
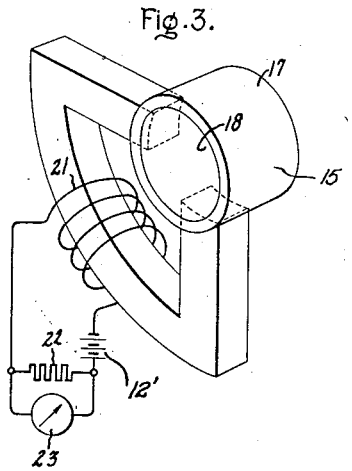
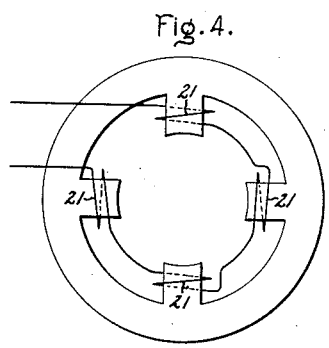
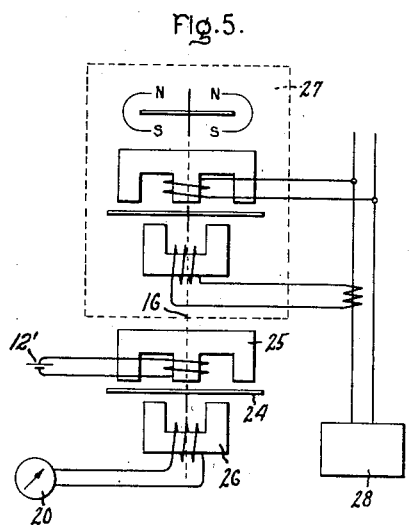
Inventor:
Robert Serrell,
by Harry E. Dunham
His Attorney.

Patented Aug. 17, 1937

2,090,521

UNITED STATES PATENT OFFICE 2,090,521

ACCELEROMETER

Robert Serrell, Schenectady, N. Y., assignor to General Electric Company, a corporation of New York Application May 2, 1934, Serial No. 723,544

7 Claims. (Cl. 175—355)

My invention relates to apparatus responsive to variations in velocity and in higher order time derivatives of velocity.

The primary object of my invention is to provide simple, rugged, easily constructed and easily operated apparatus for measuring acceleration and controlling apparatus in response to acceleration and variations of acceleration.

It is an object of my invention to produce such apparatus which shall be direct reading and shall not be influenced by friction, inertia, or loose play in the elements of the apparatus and which shall not require careful adjustment to maintain its accuracy.

It is also an object of my invention to produce apparatus responsive to derivatives of velocity or other variable quantities, including higher order derivatives as well as the first order derivative or acceleration.

Other and further objects and advantages will become apparent as the description proceeds.

In carrying out my invention in its preferred form, I make use of the phenomenon of armature reaction in rotating dynamo-electric apparatus to provide an indication of variations in acceleration. I have found that the magnitude of the magnetic field produced by currents induced in the armature of a generator varies with variations in acceleration of the rotating member.

The features of my invention which I believe to be novel and patentable will be pointed out in the claims appended hereto. A better understanding of my invention, itself, however, will be obtained by referring to the following description taken in connection with the accompanying drawing in which Fig. 1 is a diagram explaining the theory underlying the operation of my invention; Fig. 2 is a schematic representation in perspective of one embodiment of my invention; Fig. 3 represents a modified form of my invention; Fig. 4 represents a further modification; and Fig. 5 represents still another embodiment of my invention illustrating its use to form a rate-of-load-change indicator for electrical systems.

Referring now more in detail to the drawing in which like reference characters are used to designate like parts throughout, the arrangement illustrated in Fig. 2 comprises a dynamo-electric machine having a field structure including field poles 11, magnetizing windings 12, auxiliary poles 13 carrying pickup coils 14, and an armature 15 mounted on a rotating shaft 16 carrying electrical conductors 17 preferably mounted in slots in a core 18 of ferromagnetic material. It will be understood that the stationary and movable members may be interchanged, if desired, so as to make the armature 15 stationary and the field structure movable. The apparatus, the acceleration or the velocity variation of which is to be measured, is mechanically connected in any suitable manner to the shaft 16 of the armature 15.

The exciting windings 12 are supplied with current from a suitable source 12' and the pickup coils 14 are connected in series to a suitable current or voltage responsive instrument 20.

The operation of the apparatus will become apparent from a consideration of Fig. 1. In Fig. 1, a pair of electrical conductors 17 joined by end connections 19 to form a short-circuited loop are assumed to rotate in a clockwise direction about an axis 16 in a magnetic field perpendicular to the axis 16 and producing magnetic flux represented by the arrows B. As will be understood by those skilled in the art, as the conductors 17 cut the magnetic flux B, potential differences will be induced between the ends of the conductors and, since the conductors 17 are joined to form a closed loop, current will flow in the loop 17, 19 in the direction of the arrows, which current will, in turn, induce a magnetic field perpendicular to the plane of the loop represented by the arrow H.

When the loop 17, 19 is lying in the plane parallel to the flux B, as shown, the magnitude of the current inducing the field H will obviously be a maximum. The field H will produce flux linking the pick-up coil 14 so that any variations in the magnitude of the field H will produce potential differences between the terminals of the pick-up coil 14. Since for this, or any given position of the conductors 17, the magnitude of the field H is dependent only on the velocity with which the conductors 17 cut the flux lines 20, the other factors being constant, the rate of change of the field H with respect to time, i. e. first time derivative of the field H will be proportional to the first time derivative of velocity or the acceleration of the conductor 17. The voltage induced in the pick-up coil 14 is likewise proportional to the first derivative of H with respect to time so that a voltage responsive instrument connected to the pick-up coil 14 will provide an indication of acceleration. During the instant that the coil 17—19 is in the position shown, the acceleration of the conductors 17 perpendicular to flux lines B is, of course, proportional to their angular acceleration. I have discovered and it can also be demonstrated mathematically that, if a plurality of very closely spaced conductors arranged to form a drum-shaped grid as in Fig. 2, or a continuous conducting hollow cylinder as in Fig. 3 is revolved in the flux B of Fig. 1, the effects of the currents in all the conductors will be cumulative and the summation of the inductive effects produced in pick-up coil 14 will vary with the angular acceleration of the conductors 17 and the effects of the currents will also be independent of the angular position of the rotor.

In the arrangement illustrated in Fig. 2, only the pole pieces 11 and 13 of the stationary magnetic structure are illustrated but it will be understood that, if desired, and preferably so where high sensitivity is desired, the pole pieces 11 and likewise the pole pieces 13 will be joined by suitable yokes taking care to avoid interaction between the flux in yokes 11 and 13, that is, maintaining the mutual inductance of windings 12 and 14 at a minimum.

However, I have found that, if desired, where a somewhat reduced sensitivity is not objectionable, the pole pieces 11 and 13 may form a part of the same field structure as illustrated in Figs. 3 and 4 for example. In this case, the variations in velocity of the rotor will produce voltages in the exciting winding proportional to acceleration, which voltages will be superimposed on the voltage of the exciting source 12'. Consequently, if desired, in the arrangements of Figs. 3 and 4, the same winding 21 may serve simultaneously as exciting winding and pick-up coil.

Referring to Fig. 3, the winding 21 is connected to the source of exciting current 12' in series with the current shunt 22, which is paralleled by a current or voltage responsive instrument 23. With uniform rotational velocity of the rotor 15, the current indicated by the instrument 23 will remain constant but, if acceleration or deceleration takes place, the back voltages due to acceleration or deceleration will be indicated by a variation in the indication of the instrument 23. Although I believe that the armature reaction tends to act in the arrangement of Fig. 3 between the pole pieces, i. e., in electrical quadrature to the field fluxes rather than in the direction of either field flux, there appears to be a component of armature reaction aiding the field fluxes or opposing them, as the case may be, so that indications of acceleration are obtained from instrument 23.

The rotor 15 illustrated in Fig. 2 is of the squirrel cage induction motor type having rotor bars 17 electrically connected at the ends by means of end rings, the entire electrical conducting element being cast in one piece, thereby providing a rugged construction and permitting the use of elements already produced in large quantities at low cost for use in induction motors. It will be understood, however, that I am not limited to any particular type of construction of the armature conductors. If desired, the armature may also take the form of an annulus of electrically conducting material, as shown in Fig. 3, preferably mounted for the sake of increased sensitivity upon a core 18 built up of ferromagnetic laminations.

Similar in principle to the rotor arrangement of Fig. 3 is that of Fig. 5 in which a disc 24 of conducting material is substituted for the conducting cylinder 17 of Fig. 3 and the field elements 25 and 26 are substituted for the field elements 11 and 13 of Fig. 2. It will be apparent from inspection of Fig. 5 that the elements 24, 25, and 26 may be of the same construction as the elements used to form a disc type motor frequently used in an induction watthour meter.

Although my invention is primarily intended for use as an accelerometer, it will be understood that it may also be used for measuring variations in time derivatives of other quantities. For example, in the arrangement of Fig. 5, I have shown my accelerometer connected to the shaft 10 of an induction watthour meter 27, connected to measure the output load of an electrical system 28. The velocity of the shaft 16 of the watthour meter 27, obviously, is proportional to the load of the system 28 and the angular acceleration of this shaft is proportional to the rate-of-load change so that the arrangement shown in Fig. 5 may be utilized for producing a direct indication of the rate-of-load change of an electrical system.

Referring to Fig. 2, for example, there will, of course, be a tendency for the current flowing through windings 14 and the instrument 20, which is proportional to the acceleration of the shaft 16, to produce the quadrature magnetic field which will react upon the windings surrounding the pole pieces 11 in case the current in the winding 14 fluctuates. This effect will ordinarily be relatively small but, where it is anticipated that marked variations in acceleration as well as variations in velocity may occur, it may be desirable to insert a resistance 29 in series with the instrument 20 in order to minimize the strength of the current flowing in the pick-up circuit. However, in cases where it may be desired to measure the rate of change of acceleration or the second derivative with respect to time of the angular velocity of the shaft 16, this effect may be made use of by maintaining the resistance of the pick-up circuit including the windings 14 and the instrument 20 relatively low.

For the sake of measuring the rate of change of acceleration or the second time derivative of angular velocity, an additional pair of pick-up windings 30 may be placed upon the pole pieces 11 and connected in series with a current-responsive device 31. It will be understood, of course, that this effect may also be measured by means of an instrument 32 connected in series with the exciting windings 12 by observing the change from normal exciting current indicated by instrument 32. However, greater sensitivity is possible by employing separate windings since the instrument 31 may be one of high sensitivity having the maximum scale reading appreciably less than the exciting current which may be provided by the source 12'.

I have herein shown and particularly described certain embodiments of my invention and certain methods of operation embraced therein for the purpose of explaining its principle and showing its application, but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States is:

1. An acceleration responsive device comprising in combination, stationary and rotatable members, the latter being mechanically connected to apparatus the acceleration of which is to be determined, one of said members including a current conducting annulus the axis of which coincides with the axis of revolution of said apparatus and the elements of said annulus being adapted to cut magnetic flux produced by the other of said members, said other member including means for producing such magnetic flux, and means responsive to variations in the magnetic field transverse to said magnetic flux.

2. A device responsive to a time derivative of velocity comprising in combination, stationary and rotatable members, the latter being mechanically connected to apparatus the velocity variations of which are to be investigated, one of said members comprising an annulus of conducting material, the elements of which annulus are adapted successively to cut magnetic flux produced by the other of said members, said other member including means for producing such magnetic flux, a closed circuit winding linking the magnetic flux induced by current flowing in said annular member, and means responsive to variations in strength of one of said fluxes.

3. A device responsive to time variations in acceleration comprising in combination, stationary and movable members, the latter being mechanically connected to apparatus the acceleration variations of which are to be determined, one of said members including a current conductor providing a closed circuit current path and adapted to cut magnetic flux produced by the other of said members, said other member including means for producing such magnetic flux, a closed circuit winding linking the magnetic flux induced by current flowing in said current conducting member, and means responsive to the second derivative with respect to time of current flowing in said closed circuit winding.

4. A device responsive to time variations in acceleration comprising in combination, stationary and moveable members, the latter being mechanically connected to apparatus the acceleration variations of which are to be determined, one of said members comprising a plurality of current conducting elements short-circuited at their ends and adapted successively to cut magnetic flux produced by the other of said members, said other member including means for producing such magnetic flux, and means responsive to variations in strength of the flux in said flux producing means.

5. A device responsive to variations in acceleration comprising in combination, stationary and rotatable members, the latter being mechanically connected to apparatus the acceleration variations of which are to be investigated, one of said members including means for producing a magnetic flux in a given direction and the other of said members comprising a plurality of conductors along elements of a cylinder of revolution, short-circuited at their ends and adapted successively to cut magnetic flux produced by said flux producing member, said flux producing member including also a closed circuit winding linking the magnetic flux induced by currents flowing in said current conductor member, and means responsive to the rate of change of the flux strength in the direction of the flux produced by said flux producing means.

6. A device responsive to a time derivative of acceleration comprising a squirrel cage rotor driven by the apparatus the acceleration variations of which are to be determined, a stator having displaced magnetic poles inductively related to said rotor, windings on said poles, a winding on one of said poles being excited from a constant voltage direct current source, a winding on the other pole being connected in a closed circuit, and an electroresponsive instrument connected in circuit with a winding on said first mentioned pole.

7. An acceleration-responsive device comprising in combination, stationary and rotatable members, the latter being mechanically connected to apparatus the acceleration of which is to be determined, one of said members comprising a magnetic core with pole pieces at an angle to each other and extending radially inward toward a common center, a single current-conducting winding on said core, a source of direct-current energizing said winding to cause production of magnetic flux in said core and at said pole pieces, and electroresponsive means in cooperative relation with said winding, the other of said members including a current conductor providing a closed circuit path and adapted to be in proximity to said pole pieces alternately and to cut magnetic flux produced by said winding.

ROBERT SERRELL.